(12) United States Patent
Swain

(10) Patent No.: US 11,643,601 B2
(45) Date of Patent: May 9, 2023

(54) HORIZONTAL ROTATING DRUM RETORT, DISTILLATION COLUMN, AND DISTILLATION SYSTEM

(71) Applicant: Lloyd W. Swain, Vernal, UT (US)

(72) Inventor: Lloyd W. Swain, Vernal, UT (US)

(73) Assignee: Renuva, Inc., Kaysville, UT (US)

( * ) Notice: Subject to any disclaimer, the term of this patent is extended or adjusted under 35 U.S.C. 154(b) by 0 days.

(21) Appl. No.: 17/515,148

(22) Filed: Oct. 29, 2021

(65) Prior Publication Data
US 2022/0049163 A1 Feb. 17, 2022

Related U.S. Application Data

(63) Continuation-in-part of application No. 16/457,437, filed on Jun. 28, 2019, now Pat. No. 11,168,258.
(Continued)

(51) Int. Cl.
*C10B 1/10* (2006.01)
*C10B 47/30* (2006.01)
(Continued)

(52) U.S. Cl.
CPC ............... *C10B 27/06* (2013.01); *B01D 3/18* (2013.01); *B01D 3/32* (2013.01); *B01D 46/30* (2013.01); *C10B 1/10* (2013.01); *C10B 5/00* (2013.01); *C10B 19/00* (2013.01); *C10B 47/30* (2013.01); *C10G 1/02* (2013.01)

(58) Field of Classification Search
CPC .... C10B 1/06; C10B 1/08; C10B 1/10; C10B 47/30; C10B 49/16; C10B 49/18; B01J 6/002; B01J 8/10; H05B 6/102; B01D 3/32
See application file for complete search history.

(56) References Cited

U.S. PATENT DOCUMENTS 1,561,735 A 11/1925 Lucas
2,009,122 A 7/1935 Reed et al.
(Continued)

FOREIGN PATENT DOCUMENTS

JP 2007-240031 A 9/2007

OTHER PUBLICATIONS

International Searching Authority, International Search Report and Written Opinion, issued for International Application No. PCT/US2019/039941, dated Sep. 24, 2019 (13 pages).

*Primary Examiner* — Jonathan Luke Pilcher
(74) *Attorney, Agent, or Firm* — Polsinelli PC; Gregory P. Durbin

(57) ABSTRACT

A distillation system including a retort and a distillation column. The retort includes an inlet end, an outlet end opposite the inlet end and including an outlet opening, a rotatable drum configured to heat a product therein and move the product between the inlet end and the outlet end. The distillation column is coupled to the outlet end of the retort and configured to receive the product therein upon exiting the outlet opening of the retort. The distillation column includes a solid particle trap section positioned above the outlet opening, a packing section positioned above the solid particle trap section and including screen at a bottom end thereof, a dust filter therein, and a first bubble tray section positioned above the packing section and including a first outlet feed for outflow of a first fluid product.

20 Claims, 14 Drawing Sheets

Related U.S. Application Data

(60) Provisional application No. 62/691,868, filed on Jun. 29, 2018.

(51) Int. Cl.

| | | |
|---|---|---|
| *B01D 3/32* | (2006.01) | |
| *B01D 3/18* | (2006.01) | |
| *C10B 27/06* | (2006.01) | |
| *C10B 5/00* | (2006.01) | |
| *B01D 46/30* | (2006.01) | |
| *C10B 19/00* | (2006.01) | |
| *C10G 1/02* | (2006.01) | |

(56) References Cited

U.S. PATENT DOCUMENTS

| | | | |
|---|---|---|---|
| 2,150,532 A | 3/1939 | Wiegand et al. | |
| 2,840,515 A * | 6/1958 | Fernando | C07C 51/412 568/397 |
| 3,109,781 A * | 11/1963 | Natland | C10B 1/04 376/325 |
| 3,401,924 A | 9/1968 | Hurst | |
| 3,618,918 A | 11/1971 | Tembe | |
| 4,039,794 A | 8/1977 | Kasper | |
| 4,352,969 A | 10/1982 | Wulf | |
| 4,389,283 A | 6/1983 | Calderon | |
| 4,439,209 A * | 3/1984 | Wilwerding | C10B 53/00 422/204 |
| 5,083,870 A | 1/1992 | Sindelar et al. | |
| 5,554,836 A | 9/1996 | Stanescu et al. | |
| 5,798,496 A | 8/1998 | Eckhoff et al. | |
| 5,914,065 A | 6/1999 | Alavi | |
| 6,268,590 B1 | 7/2001 | Gale et al. | |
| 2003/0050519 A1 * | 3/2003 | Cheng | C10B 47/06 201/2.5 |
| 2006/0076224 A1 * | 4/2006 | Ku | C10B 47/44 202/262 |
| 2011/0226607 A1 * | 9/2011 | Anderson | C10G 7/08 203/84 |
| 2011/0230689 A1 * | 9/2011 | Scheirs | C10B 53/07 205/261 |
| 2012/0310023 A1 * | 12/2012 | Huang | C10G 1/002 585/241 |
| 2014/0305786 A1 * | 10/2014 | Beaver | C10B 53/07 202/110 |
| 2016/0216051 A1 * | 7/2016 | Kurukchi | F28F 25/08 |
| 2016/0345387 A1 | 11/2016 | Russomagno | |

* cited by examiner

(12) United States Patent

HORIZONTAL ROTATING DRUM RETORT, DISTILLATION COLUMN, AND DISTILLATION SYSTEM

CROSS-REFERENCE TO RELATED APPLICATIONS

This application is a continuation-in-part of U.S. patent application Ser. No. 16/457,437 filed Jun. 28, 2019, which claims the benefit of U.S. Provisional Patent Application No. 62/691,868, filed Jun. 29, 2018, the entire contents of both applications are hereby incorporated by reference in their entireties into the present application.

TECHNICAL FIELD

The present disclosure relates generally to retorts, and, more specifically, retorts with a rotating drum oriented horizontally.

BACKGROUND

A retort is an airtight or nearly airtight vessel that supports and heats a fossil fuel (or biomass) therein for the purposes of removing particulate matter from the fossil fuel and providing a "clean" energy product. Various retort designs have been proposed and used for quite some time. An example of a fossil fuel for use in a retort is coal, and oil shale, among others.

Upon heating the fossil fuel in the retort, the fossil fuel gives off gaseous products in the form of particulate matter that can be processed into useful products. The fossil fuel itself, upon sufficient removal of the gaseous products, may be cooled and further processed to produce a "cleaner" fuel product (e.g., charcoal with fewer particulates). Such cleaner products produce less emissions, for example, when burned.

In order to process the gaseous product, it is condensed into liquid products in a distillation column. Different products (e.g., fuel oil, lubricants, gas oils, kerosenes, naphthas) can be drawn from the distillation column at different heights along the column with temperatures decreasing along the height. One challenge with processing the gaseous product is removing solid particles such as dust from the distillation column. Solid particles in a distillation column can reduce the quality of the end products as well as attach to (i.e., gum up) the inside walls of the distillation column, which necessitates cleaning of the column.

Accordingly, there is a need in the art for retorts utilizing modern design techniques to produce a cleaner burning fuel product, among other advantages and needs.

SUMMARY

Aspects of the present disclosure may involve a retort including a drum, an electric induction coil, a motor, and first and second jacks. The drum includes an inlet port at an inlet end, an outlet port at an outlet end, and a cylindrical tube extending between the inlet end and the outlet end. The electric induction coil is proximate the cylindrical tube for heating the cylindrical tube. The motor is operably and rotatably coupled to the cylindrical tube of the drum. The first jack is coupled to the drum proximate the inlet end, and is configured to raise and lower the inlet end of the drum. And the second jack is coupled to the drum proximate the outlet end, and is configured to raise and lower the outlet end of the drum.

In certain instances: the drum may include an inlet seal and bearings and an outlet seal and bearings so as to permit the cylindrical tube to rotate relative to the inlet and outlet ports; the retort may include an outer cover encasing at least a portion of the cylindrical tube of the drum and the electric induction coil; the outer cover is not operably and rotatably coupled with the motor such that it remains stationary when the cylindrical tube rotates; the first jack is coupled to the outer cover and the drum, and the second jack is coupled to the outer cover and the drum; the first jack is coupled to a first roller that is supported against the drum, and the second jack is coupled to a second roller that is supported against the drum; the cylindrical tube may include at least one lifter coupled to an inner wall of the cylindrical tube; the electric induction coil encircles the drum; the motor is configured to rotate the drum with the electric induction coil remaining static; and the retort may include a carriage frame coupled to the first jack and the second jack.

Aspects of the present disclosure may involve a retort may include a first drum, a second drum, a motor, a first jack and a second jack. The first drum may include a first inlet port at a first inlet end, a first outlet port at a first outlet end, and a first cylindrical tube extending between the first inlet end and the second outlet end, the first drum configured to heat a product therein in the absence of oxygen. The second drum may include a second inlet port at a second inlet end, a second outlet port at a second outlet end, and a second cylindrical tube defining a cavity therein and extending between the second inlet end and the second outlet end, the first cylindrical tube positioned within the cavity of and coupled to the second cylindrical tube, the cavity configured to provide combustion therein so as to heat the first cylindrical tube of the first drum. The may be motor operably and rotatably coupled to the first and second cylindrical tubes. The first jack may be coupled to the second cylindrical tube proximate the second inlet end, the first jack configured to raise and lower the second inlet end of the second drum. And the second jack may be coupled to the second cylindrical tube proximate the second outlet end, the second jack configured to raise and lower the outlet end of the second drum.

In certain instances: the first drum may include a first inlet seal and bearing, and a first outlet seal and bearing, the second drum may include a second inlet seal and bearing and a second outlet seal and bearing, wherein the first and second cylindrical tubes are configured to rotate relative to the first inlet port, second inlet port, first outlet port, and second outlet port; the first jack is coupled to a first roller that rotatably supports second cylindrical tube, and the second jack is coupled to a second roller that rotatably supports the second cylindrical tube; and the retort may include a sprocket coupled to the first and second cylindrical tubes, wherein the motor is coupled to the sprocket via a chain.

Aspects of the present disclosure may involve a method of using a retort may include setting a slope of a drum of the retort relative to a horizontal plane such that an inlet end of the drum is higher than an outlet end of the drum, the drum may include an inlet port at the inlet end, an outlet port at the outlet end, and a cylindrical tube extending between the inlet end and the outlet end, the retort may include: an electric induction coil proximate the cylindrical tube for heating the cylindrical tube; a motor operably and rotatably coupled to the cylindrical tube of the drum; a first jack coupled to the drum proximate the inlet end, the first jack configured to raise and lower the inlet end of the drum; and a second jack coupled to the drum proximate the outlet end, the second jack configured to raise and lower the outlet end of the drum.

The method may further include feeding ore into the inlet port of the drum. And the method may further include heating the drum via the electric induction coil so as to remove volatiles from the ore.

In certain instances: the method may include removing oxygen from the drum.

In certain instances, setting the slope of the drum may include adjusting the first and second jacks; the retort may include an outer cover may include a second cylindrical tube that at least partially encases the drum; the method may include rotating the drum within the outer cover; and the drum of the retort may include lifters on an internal side thereof.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
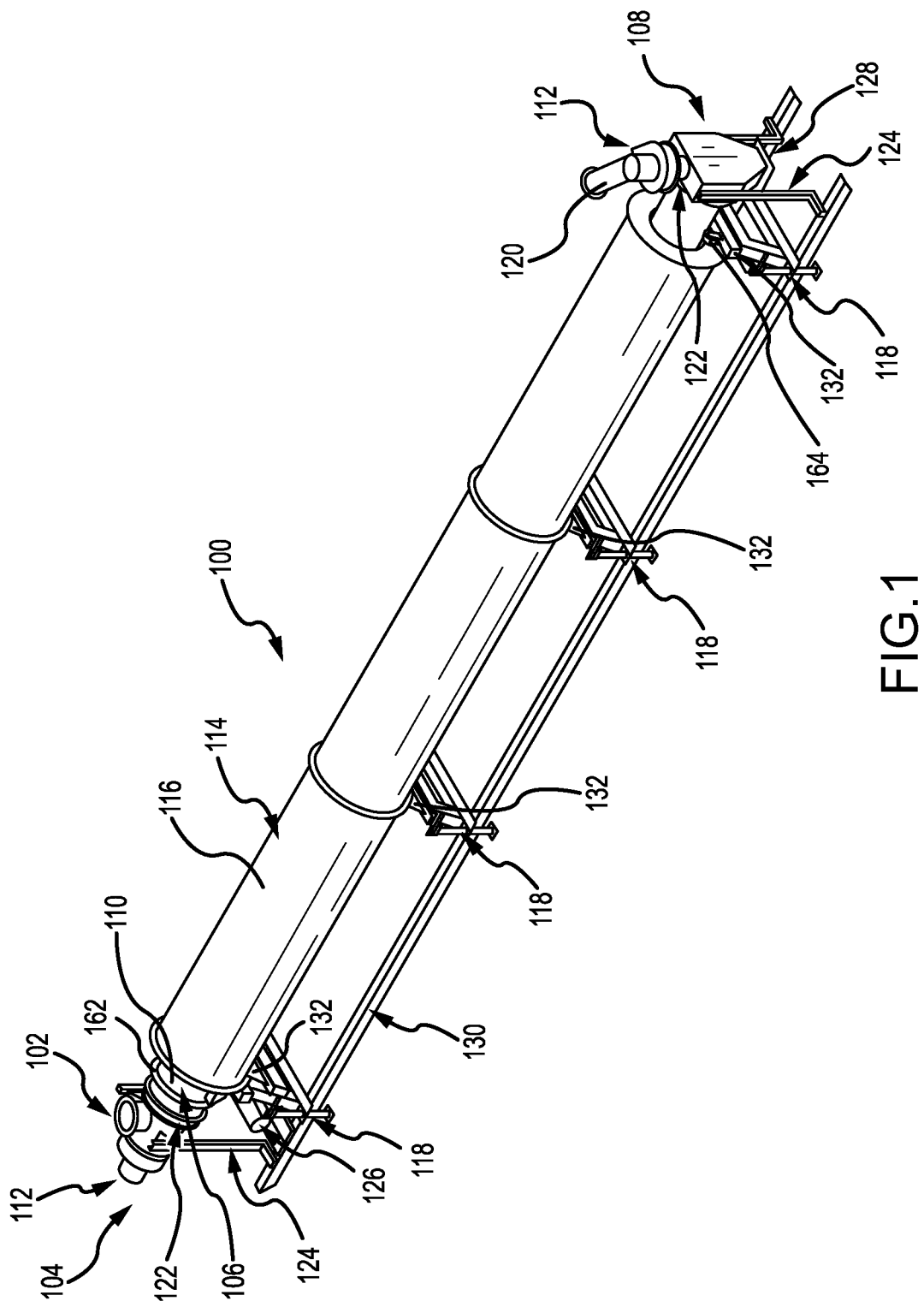
FIG. 1 is an isometric view of a first embodiment of a retort.

Aspects of the present disclosure involve a clean-energy technology process applicable to process coal, and oil shale, among other biomass products. The following is a description of a retort 100, as seen in FIG. 1. The function of the retort 100 is to heat coal or oil shale, among other products, to varying degrees of heat in an oxygen-free environment and remove the hydrocarbons in vapor form with a vacuum or slight vacuum within the retort 100. The hydrocarbon vapor may be transferred to a distillation tower (not shown in FIG. 1) from the retort 100. In the tower, the vapors are condensed to a liquid. The liquid may then be drained off into storage tanks for the different products that are extracted from the coal or oil shale. The char or the spent shale, from the retort 100, may be discharged with a high percentage of the contaminants removed, which provides a much cleaner fuel for use in a power plant or other application.

The process of using the retort 100 may be as follows. The ore—coal, oil shale, or organic material (e.g., wood, crops, garbage) used in the retort 100—may be crushed to ⅜ inch minus size. In certain instances, the ore may be crushed to a different size. Upon being crushed, the ore may be transferred to a bin (not shown) on top of the feed port 102 of the horizontal retort 100. The feed port 102 is at a feed end 104 of the retort 100. The control of the feed into the feed port 102 may be regulated by an air lock rotary valve with a "time on"/"time off" switch at the bottom of the feed bin. Additionally or alternatively, the control of the feed into the feed port 102 may be regulated by changing the rotational speed of the drum and/or the angle of the drum. The feed bin may maintain a head of ore at the feed port 102 of the retort 100.

Figure 2:
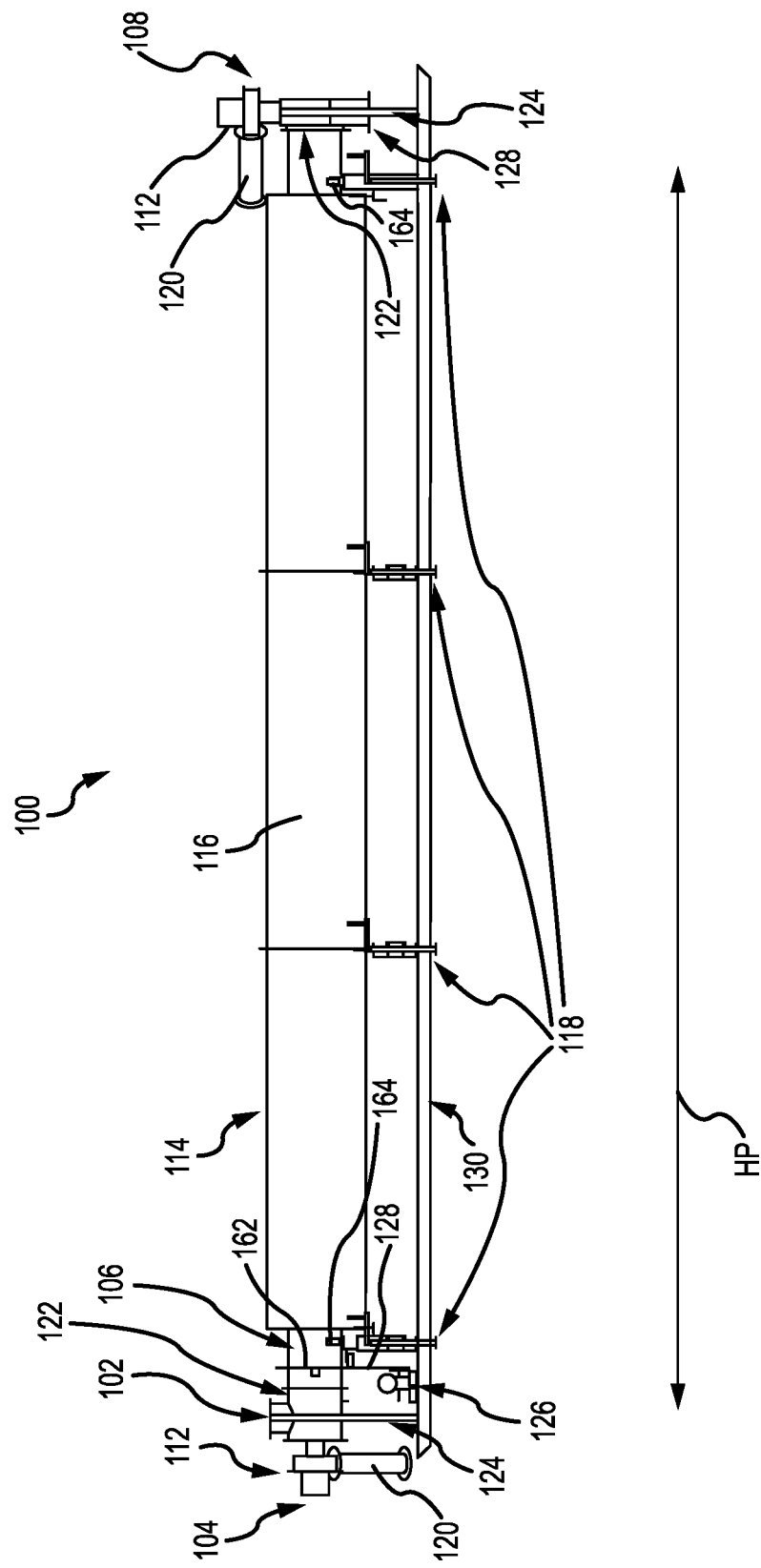
FIG. 2 is a side view of the retort of FIG. 1.

Once the ore is in the feed port 102, the flow of the ore through the retort 100 may be controlled by the slope of a rotating drum 106 of the retort 100 from the feed end or intake end 104 to a discharge end 108. And while the rotating drum 106 as seen in FIG. 2 is shown being level with the horizontal plane HP, it is to be understood that the rotating drum 106 may be angled relative to the horizontal plane with the intake end 104 being higher than the discharge end 108 to facilitate the ore moving through the rotating drum 106 via gravity and the angled nature of the retort 100. In a certain instance, the slope may be about 5 degrees from the horizontal axis. In a certain instance, the slope may be about 10 degrees from the horizontal axis. In a certain instance, the slope may be about 15 degrees from the horizontal axis. In a certain instance, the slope may be about 20 degrees from the horizontal axis. In a certain instance, the slope may be about 25 degrees from the horizontal axis. In a certain instance, the slope may be about 30 degrees from the horizontal axis.

Figure 3:
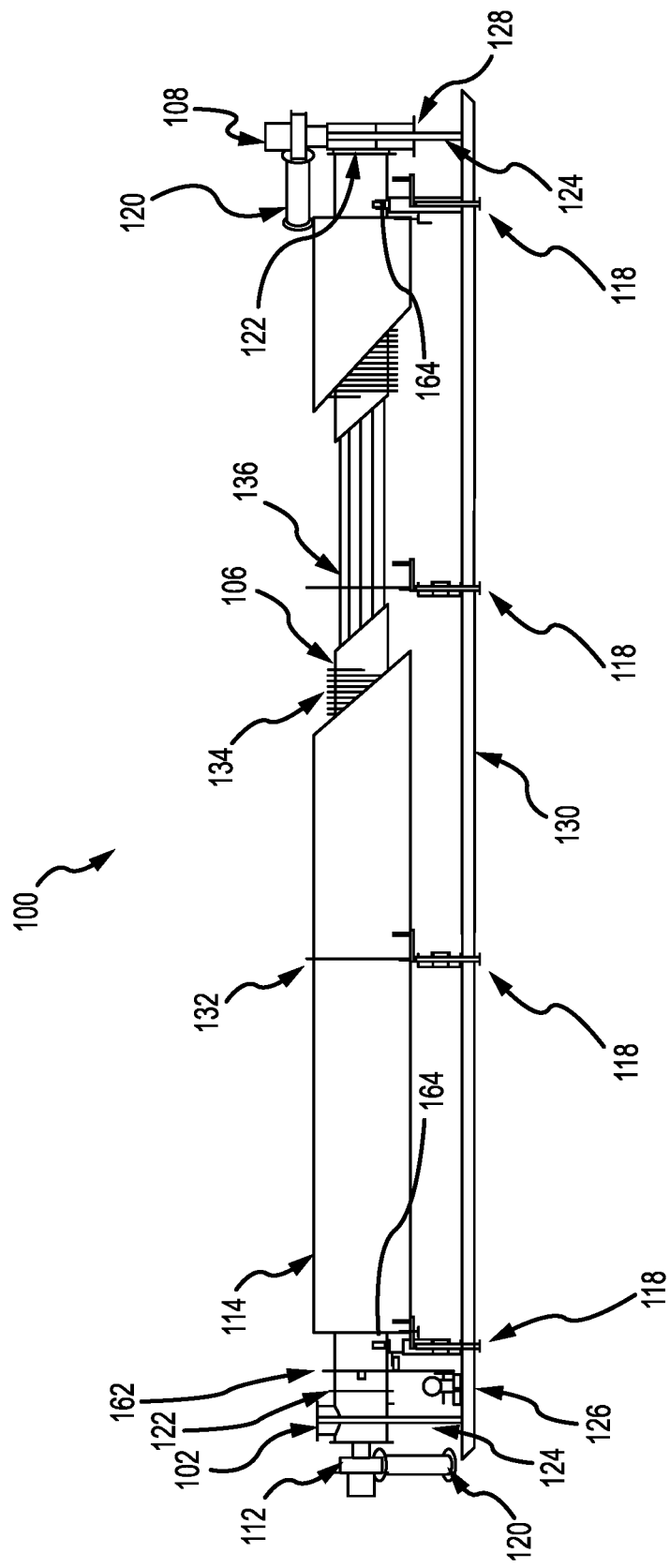
FIG. 3 is a side view of the retort of FIG. 1, except a portion of the retort is shown cutaway.

The rotating drum 106 may include a cylindrical tube 110 supporting the ore therein. On an internal side of the cylindrical tube 110, the rotating drum 106 may include lifters, flanges, or flighting 136 (as seen in FIG. 3) such that as the lifters 136 rotate with the drum 106, the ore spills off the lifters 136, and falls in the downward direction through the process and moves towards the lower, discharge end 112. The lifters 136 may be continuous or discontinuous pieces of metal that are welded or otherwise coupled to the internal wall of the cylindrical tube 110. The lifters 136 may wrap around the internal wall in a helical fashion, or may be linear strips of metal.

The retort 100 may also include another air-lock rotary valve 112 at the discharge end 108 that insures an oxygen-free environment inside the retort 100. Alternatively, a double drop valve or the like can be substituted for the air-lock rotary valve 112. The operator of the retort 100 may monitor the temperature of the ore via thermostats positioned throughout the retort 100, for example, and may adjust the slope of the rotating drum 106 to maintain the temperature necessary for the ore type, size, intended result, etc. The discharge rotary valve 112 may be controlled with a "time on"/"time off" switch to balance the discharge with the flow of the ore into the retort 100.

As the ore is heated up to around 930 degrees Fahrenheit within the rotating drum 106, it releases the hydrocarbon gasses as it flows through the process. A slight vacuum or full vacuum may be maintained inside the retort 100 by the air-lock valves 112, which may be variable-speed vacuum fans at the ends of the retort 100. As described previously, the vapors may be transferred to a distillation tower where they are condensed into various petroleum products with market value. In some instances, vapor outlets may be positioned along the tube such that different vapors are emitted and extracted at different processing stages.

The processed ore can be routed through a dryer (not shown) to use the heat for the drying process or it can be transferred to a char storage bin through the heat ex-changer with a cold-water jacket without going through the dryer. The ore may be discharged from the heat ex-changer into a bucket or belt conveyor that takes the ore to the top of the char storage bin.

Figure 4:
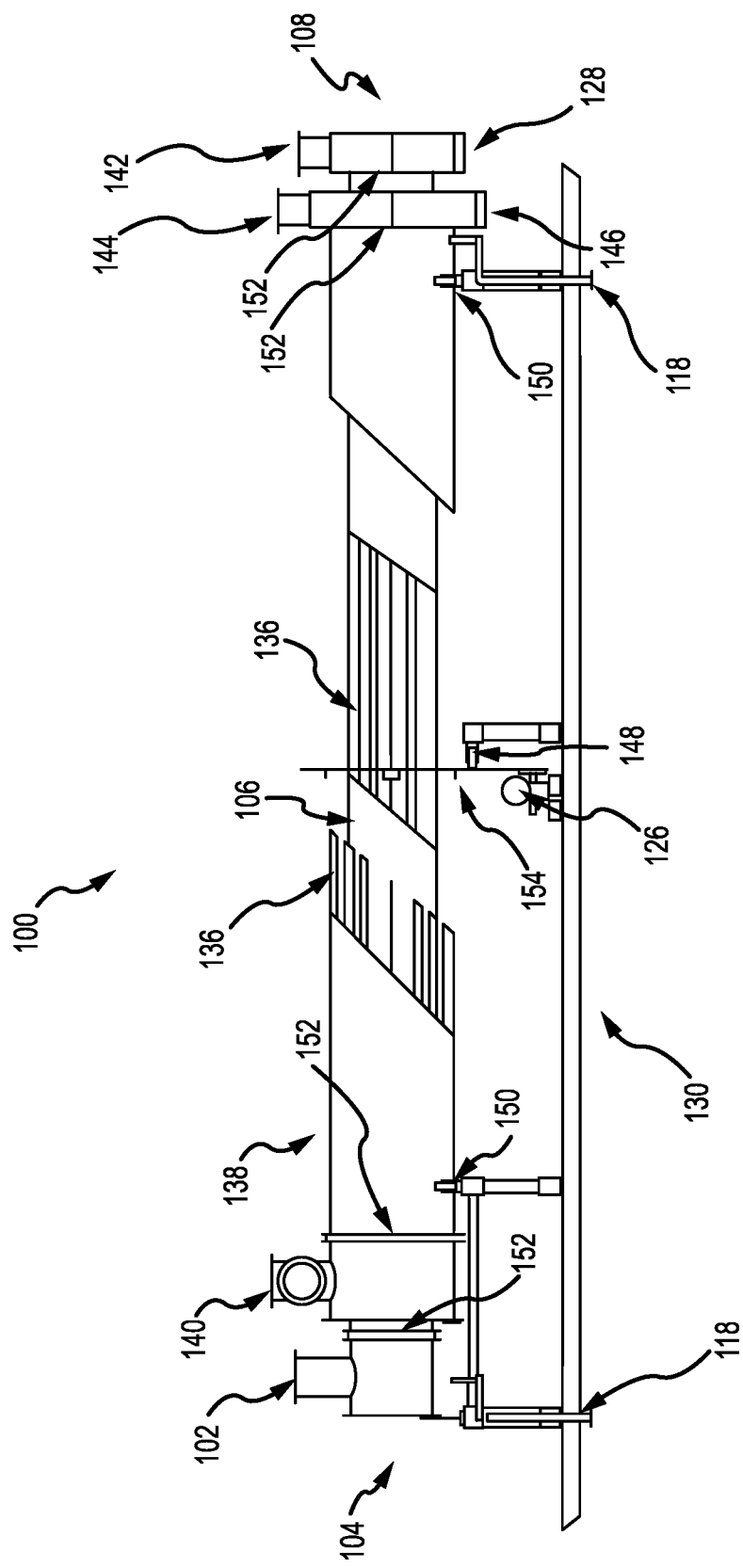
FIG. 4 is a side view of a second embodiment of a retort with a portion of the retort shown cutaway.
Figure 5:
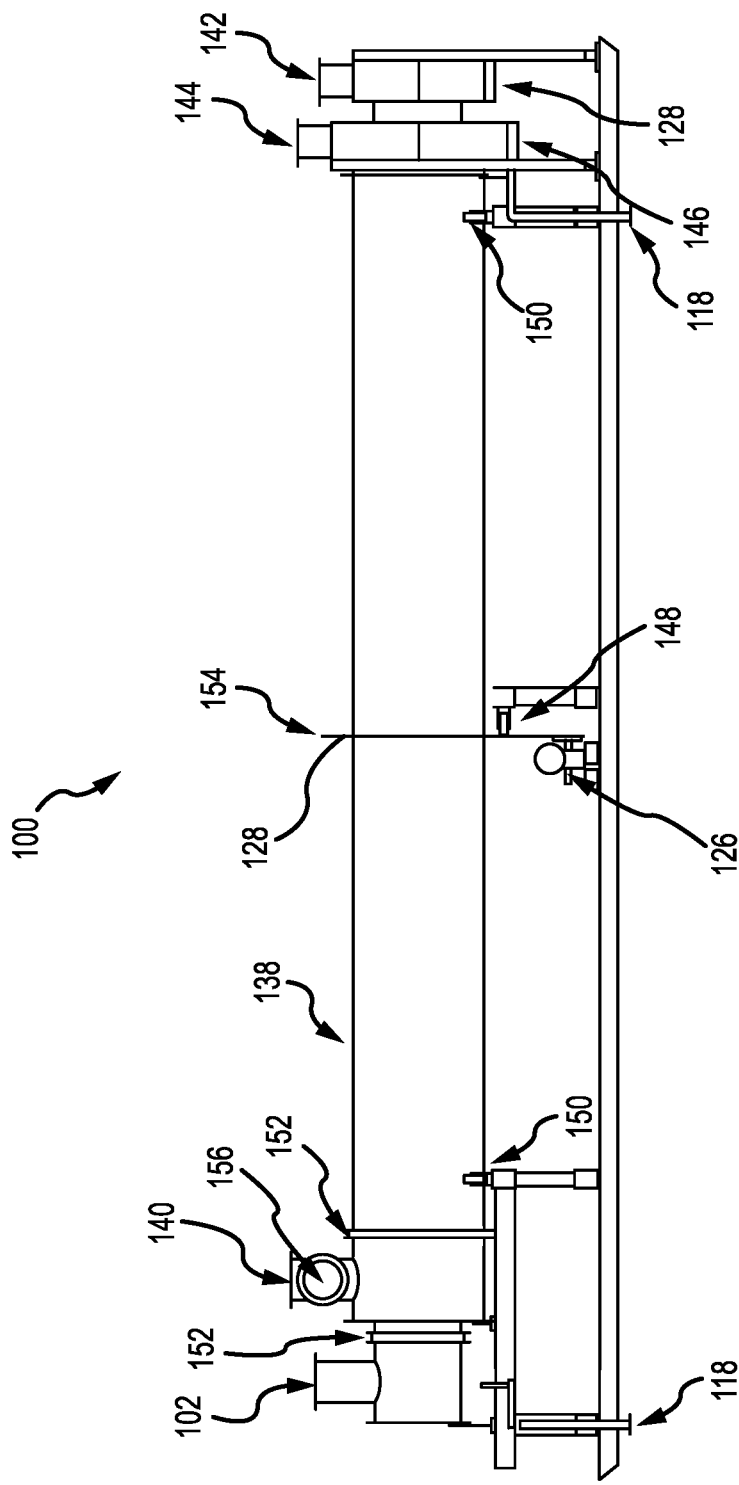
FIG. 5 is a side view of the retort of FIG. 4.
Figure 6:
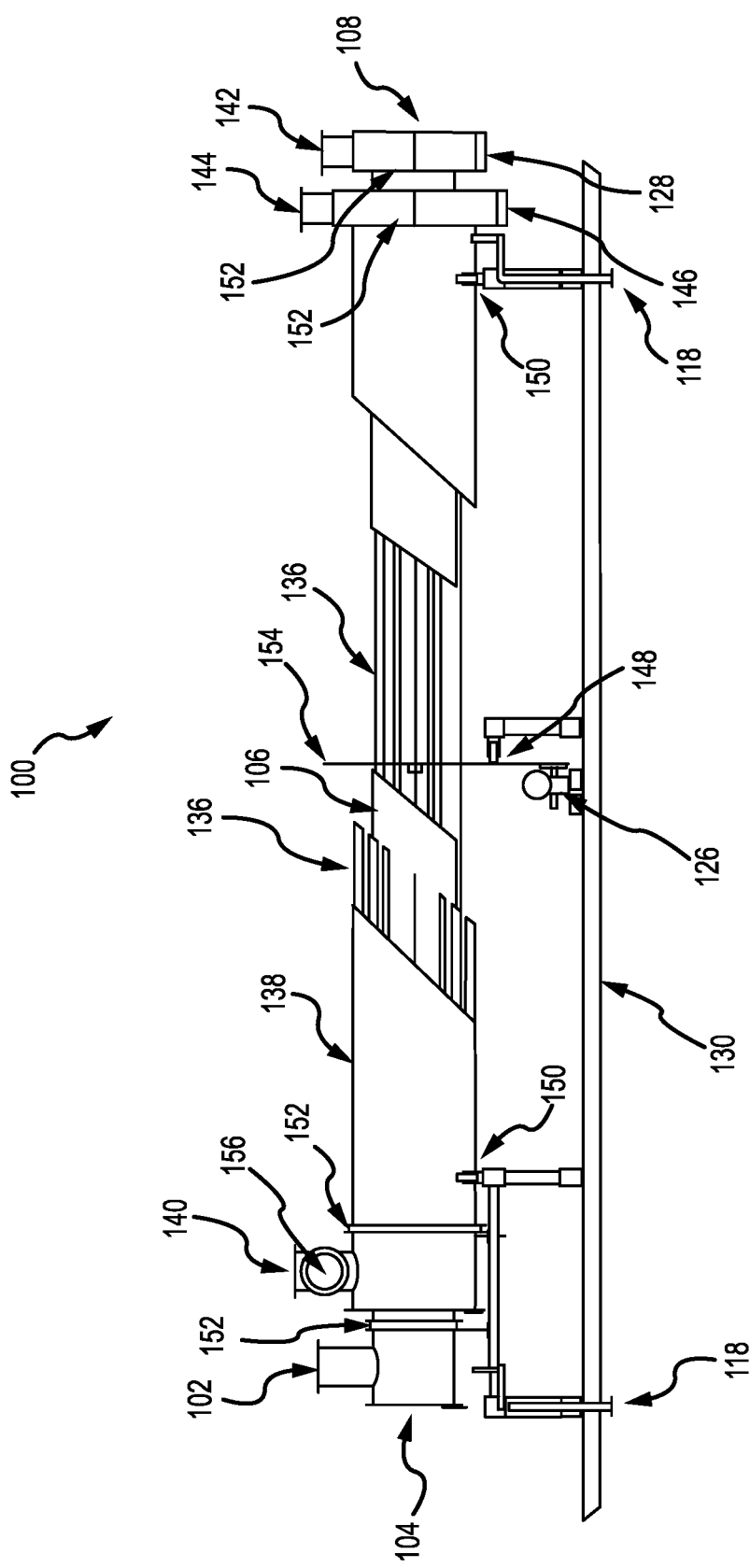
FIG. 6 is a side view of the retort of FIG. 4.

The hot ash or processed ore may also be routed through the dryer if solid fuel is used for the heat source in the retort 100, as may be the case with the retort of FIGS. 4-6. The ore may be heated to a temperature of about 230 degrees to evaporate the surface moisture. In certain instances, this may increase the efficiency of the retort 100.

If a fire source of heat is used (as opposed to an electric heating source), as may be the case with the retort of FIGS. 4-6, the flue gasses may be sucked through a pipe and filtered through an aeration system in an algae pond where the toxins will be consumed by the algae. Oxygen is produced by the algae making a clean process.

Support equipment such as a crusher, serener, surge bins, dryer, bucket elevator, condensing tower, augers and conveyors are not shown in every instance, but a person having ordinary skill in the art would understand these components can be utilized in the retort 100 and overall system for generating clean energy/fuel.

Figure 9:
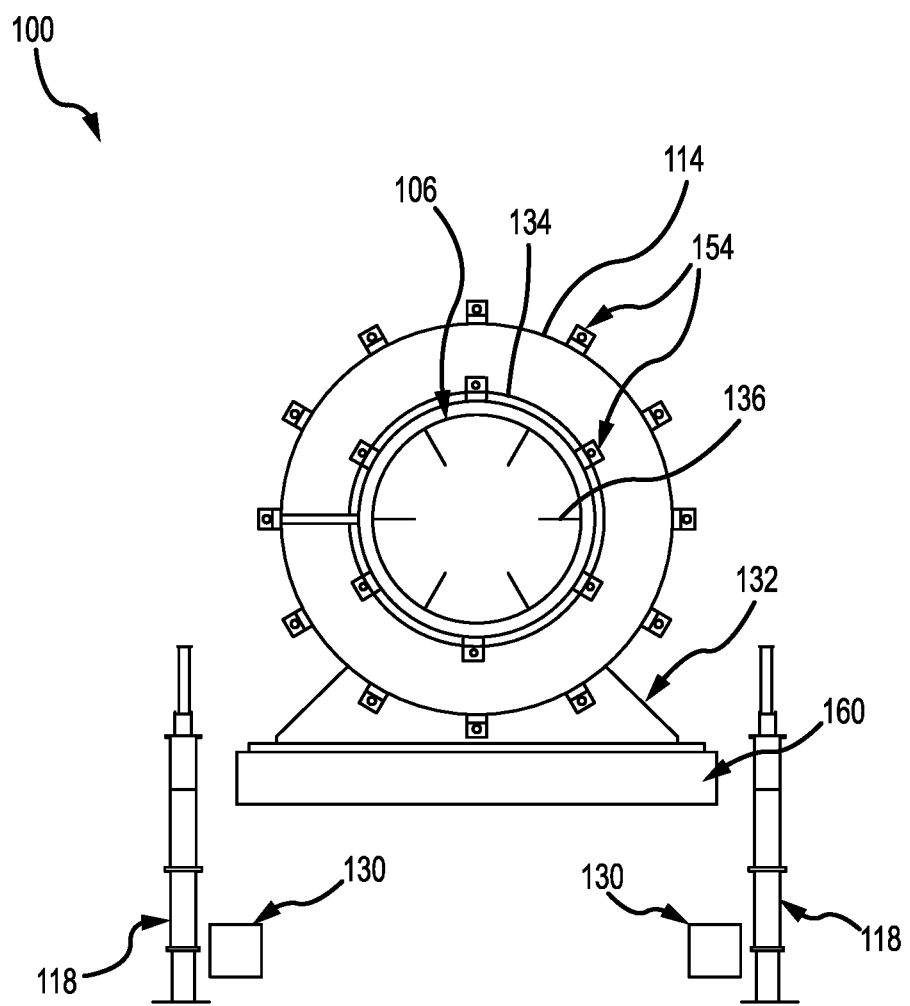
FIG. 9 is an open end view of the retort of FIG. 1.

The retort 100 will be discussed in further detail with respect to FIGS. 1-3. FIGS. 1-3 depict, respectively, an isometric view of a first embodiment of a retort 100, a side view of the retort 100, and a cutaway side view of the retort 100. As seen in the figures, the retort 100 includes an outer cover 114 in the form of a cylindrical tube 116. The outer cover 114 may be supported by leveling jacks 118 (e.g., trailer jacks) which can be raised or lowered so as to raise or lower the portion of the outer cover 114 that is supported on the particular leveling jack 118. In this way, the leveling jacks 118 may adjust a slope or angle of the retort 100 (relative to a horizontal axis) from an intake end 104 to a discharge end 108 such that the ore moves via gravity from the intake end 104 to the discharge end 108. A flow rate of the ore through the retort 100 may be adjusted by increasing or decreasing the slope or angle of the retort 100 (or, more particularly, the rotating drum 6). The leveling jacks 118 as described herein may include hydraulic, pneumatic or mechanical (e.g., screw-driven scissor jack) lifting devices. The leveling jacks 118 may be considered adjustable supports. And as seen in FIG. 9, there may be a pair of leveling jacks 118 coupled together via cross-braced tubing 160 where the pair of leveling jacks 118 are adjusted up or down in concert with each other.

In place of the leveling jacks 118, a frame or support may be utilized in the retort 100. The support may be height adjustable or non-adjustable. The adjustable support may be capable of manually adjusting the height of the cross-braced tubing 160. For example, the adjustable support may include a series of spaced-apart through-holes for extending a shaft of the cross-braced tubing 160 through. The adjustable support may have its heights set along a length of the retort 100 to accomplish the desired slope from the intake end 104 to the discharge end 108.

In the case of non-adjustable supports, there may be a number (e.g., four non-adjustable supports in the use with the retort 100 of FIG. 1) of non-adjustable supports of different heights positioned at various lengths along between the intake end 104 and discharge end 108 to accomplish the desired slope of the retort 100.

As seen in FIGS. 1-3, the rotating drum 106 is positioned within an inner cavity of the outer cover 114. Ore is fed into the rotating drum 106 via an ore feed or intake opening 102. Because of the slope of the retort 100 from left-to-right (as seen in FIG. 2, and assuming an angle relative to the horizontal plane HP where the intake end 104 is higher than the discharge end 108), the ore will travel from the ore feed 102 into the rotating drum 106. To the left of the ore feed 102 is a vapor fan 112 which draws vapor from within the rotating drum 106 and out a vapor tube to a distilling tower (not shown). At an opposite end of the retort 100 (at the discharge end 108), another vapor fan 112 and vapor tube 120 exhaust air and vapor from within the rotating drum 106 and to the distilling tower.

Back at the intake end 104, between the ore feed 102 and the rotating drum 106 is a seal and bearing 122 permitting the rotating drum 106 to rotate while the ore feed 7 remains stationary and fixed to a mount 124. A gear motor 126 is coupled to the rotating drum 106 via a belt or chain (or similar component) 128 (as seen in FIG. 2) that engages a sprocket 162 that is coupled to the rotating drum 106. In this way, as the motor 126 rotates, the chain 128 is caused to rotate, which cause the sprocket 162 and the rotating drum 106 to rotate within the outer cover 114. With the retort 100 of FIGS. 1-3, the outer cover 114 remains stationary or static (i.e., it does not rotate with the drum 106).

At the discharge end 108, the retort 100 includes an ore discharge or discharge opening 128 that is linked with the rotating drum 106. Between the ore discharge 128 and the rotating drum 106 is a seal and bearing 122 for permitting the rotating drum 106 to rotate while the ore discharge 128 and vapor fan 112 remain stationary and supported by a mount 124. The retort 100 may be supported by a carriage frame 130 extending generally the length of the retort 100. The mounts 124 on either end of the retort may be supported on the carriage frame 130.

Referring to FIGS. 1-3, it can be seen that above that there are four leveling jacks 118 used to support the retort 100 above the ground. The two inner leveling jacks 118 may include a connection flange 132 including a concave, semi-cylindrical surface for supporting the outer cover 114. The flange 132 may be at the interconnection or seal of the cylindrical tubes 116 of the outer cover 114. In this way, the retort 100 may include three sections of cylindrical tubes 116 making up the outer cover 114. The three sections of cylindrical tubes 116 may be coupled together at or near the connection flanges 132 of the two inner leveling jacks 118.

As seen in FIG. 9, the outer tubes 116 of the outer cover 114 are supported on the flange 132. Referring back to FIGS. 1-3, the two outer leveling jacks 118 are coupled to drum rollers 164 positioned against and supporting the rotating drum 106. Thus, as the rotating drum 106 rotates, the drum rollers 164 passively rotate. The two outer leveling jacks 118 may also include connection flanges 132 that couple to the outer cover 114. As seen in FIG. 1, the connection flange 132 coupled with the leveling jack 118 nearest the discharge end 108 includes a ring or annular disk that is coupled to the end of the outer cover 114. The rotating drum 106 extends through the central opening of the annular disk.

As seen in the cutaway portion in FIG. 3, in between an inner wall of the outer cover 114 and an outer wall of the rotating drum 106 are heat induction coils 134 that may be coupled to the outer cover 114. The coils 134 may wrap around or encircle the rotating drum 106 and permit the rotating drum 106 to rotate within an inner volume formed by the coils 134. The coils 134 may be connected to a power source (not shown) in order to generate heat on the rotating drum 106.

As seen in FIG. 3, within the rotating drum 106 are lifters 136 coupled to an internal wall of the drum 106 that are designed to agitate or mix the ore positioned within the drum 106. In FIG. 3, the lifters 136 are shown as linear strips of metal or steel angles. Thus, as the drum 106 rotates, the ore contacts the lifters 136 and is moved throughout the drum 106 and downward along the slope of the drum 106 towards the discharge end. The lifters 136 may be steel welded or coupled to an inner wall of the drum 106, and may be linear or curved. Additionally or alternatively, the lifters 134 may be continuous along the entire length of the rotating drum 106 or may be discontinuous along the length.

Continuing on, reference is made to FIGS. 4-6, which depict a second embodiment of a retort 100. FIGS. 4-6 depict, respectively, a cutaway side view of the retort 100, a side view of the second embodiment of the retort 100, and another cutaway side view of the second embodiment of the retort 100. The retort 100 in these figures may include many of the same or similar components to the retort 100 in FIGS. 1-3, except the retort 100 in FIGS. 4-6 utilizes a burning ore as a heat source to heat the rotating drum 106. As seen in FIG. 4, the stationary outer cover (of the previous embodiment) is replaced by an outer rotating drum 138 that rotates along with the inner rotating drum 106. As such, both the inner and outer drums 106, 138 rotate in this embodiment of the retort 100.

The outer rotating drum 138 includes a hot ore or hot ash feed 140 for intaking ore to be heated/burned within the outer rotating drum 138. Since the inner rotating drum 106 is positioned within the cavity of the outer rotating drum 138, the hot ore heats up the inner rotating drum 106 so as to cause the ore feed within the inner rotating drum 106 to release gaseous vapors through the vapor port 142 and to the distillation tower.

Opposite the hot ore feed 140 is a vapor port 144 for exhausting vapors from within the cavity between the inner wall of the outer rotating drum 138 and the outer wall of the inner rotating drum 106. The outer rotating drum 138 also includes a hot ore or hot ash discharge 146 for discharging the hot ore or hot ash after it has moved longitudinally through the outer rotating drum 138.

The retort of FIG. 4 may include a gear motor 126 (positioned near the middle of the retort 100) for rotating the outer rotating drum 138, and the inner rotating drum 106. More particularly, the gear motor 126 may be rotatably coupled to a sprocket 154 that is coupled to the outer and inner rotating drums 138, 106 via a chain (not shown in FIG. 4). A thrust roller 148 may be positioned adjacent the sprocket 154, and may roll against the sprocket 154, passively, as the sprocket 154 is driven by the gear motor 126 and chain. In this way, the thrust roller 148 may function as an idler, and may also function to support the retort 100 as it is angled downward. As seen in the figure, the thrust roller 148 is on a downward or discharge side of the sprocket 154.

The outer rotating drum 138 may be supported by carriage or drum rollers 150 at both the intake end 104 and discharge end 108. The rollers 150 may be coupled to leveling jacks 118 for raising and lowering the portion of the retort 100 to which it is coupled. Thus, the leveling jacks 118 may be used to angle the rotating drums 138, 106 at an angle such that the ore fed into the ore feed 102 and hot ore fed into the hot ore feed 140 are caused to move or tumble via gravity from the intake end 104 to the discharge end 108.

As seen in FIG. 4, the portion of the rotating drums 138, 106 intermediate of the intake ports 102, 140 and the discharge ports 144, 142 may rotate while the outer portions remain stationary. The retort 100 may include seals and bearings 152 to facilitate the inner portion of the rotating drums 138, 106 to rotate relative to the outer portions. And as seen in FIG. 4, the retort 100 may include lifters 136 coupled to an inner wall of the outer rotating drum 138, and lifters 136 coupled to an inner wall of the inner rotating drum 106. In FIGS. 5-6, the fuel feed 140 includes an air input port 156 for air to enter and aid in the combustion with the hot ore.

As described previously, the thrust roller 148 passively roll against the drum sprocket 154 such that as the gear motor 126 operates to rotate the drum sprocket 154 via a chain, the thrust roller 148 passively rotates with the drum sprocket 154 on the discharge side of the drum sprocket 154. The drum sprocket 154 may be a sprocket that is welded to the outer drum 138 such that as the drum sprocket 154 is driven via the motor 126, the outer drum 138 rotates as well. In certain instances, the outer drum 138 is rigidly coupled to the inner drum 106 such that they rotate together. And in certain instances, the outer drum 138 is rotatably coupled to the inner drum 106 such that they may rotate independent of each other.

In certain instances, the heat sources for the retort 100 that is fed into the hot ore port 140 may be solid fuel (coal or shale or spent shale), natural gas, propane, crude oil or used recycled oil, land fill garbage, and/or a combination of any of the above heat sources.

Figure 7:
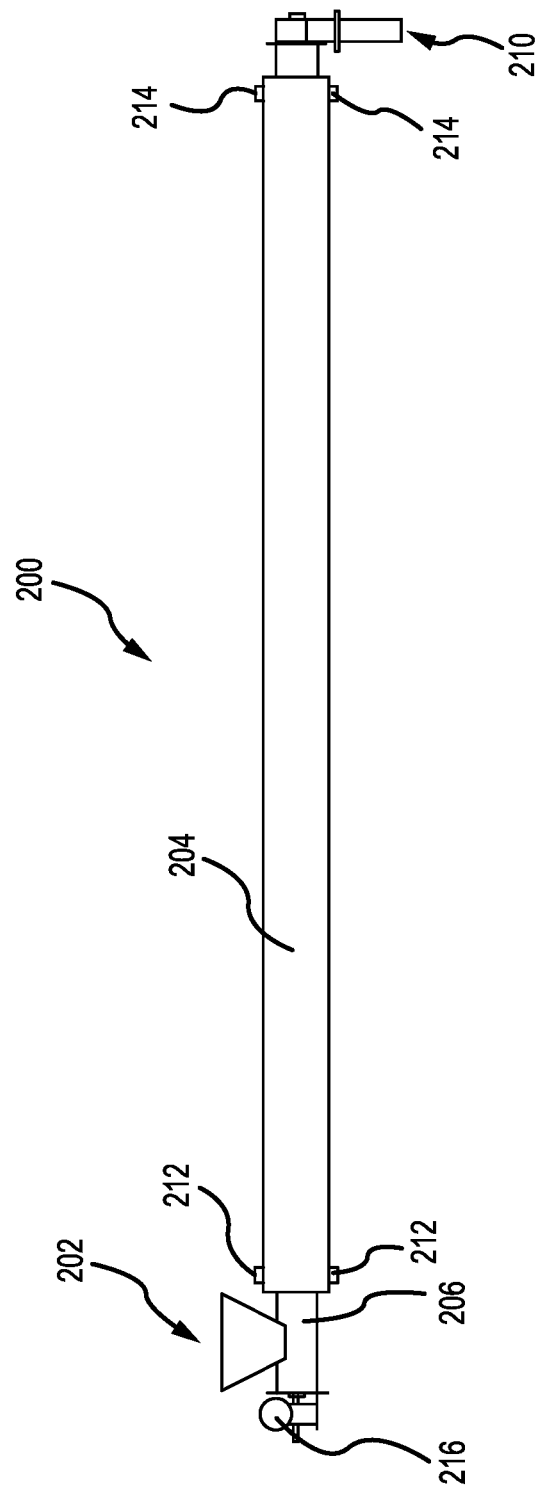
FIG. 7 is a side view of a cooler or heat exchanger.
Figure 8:
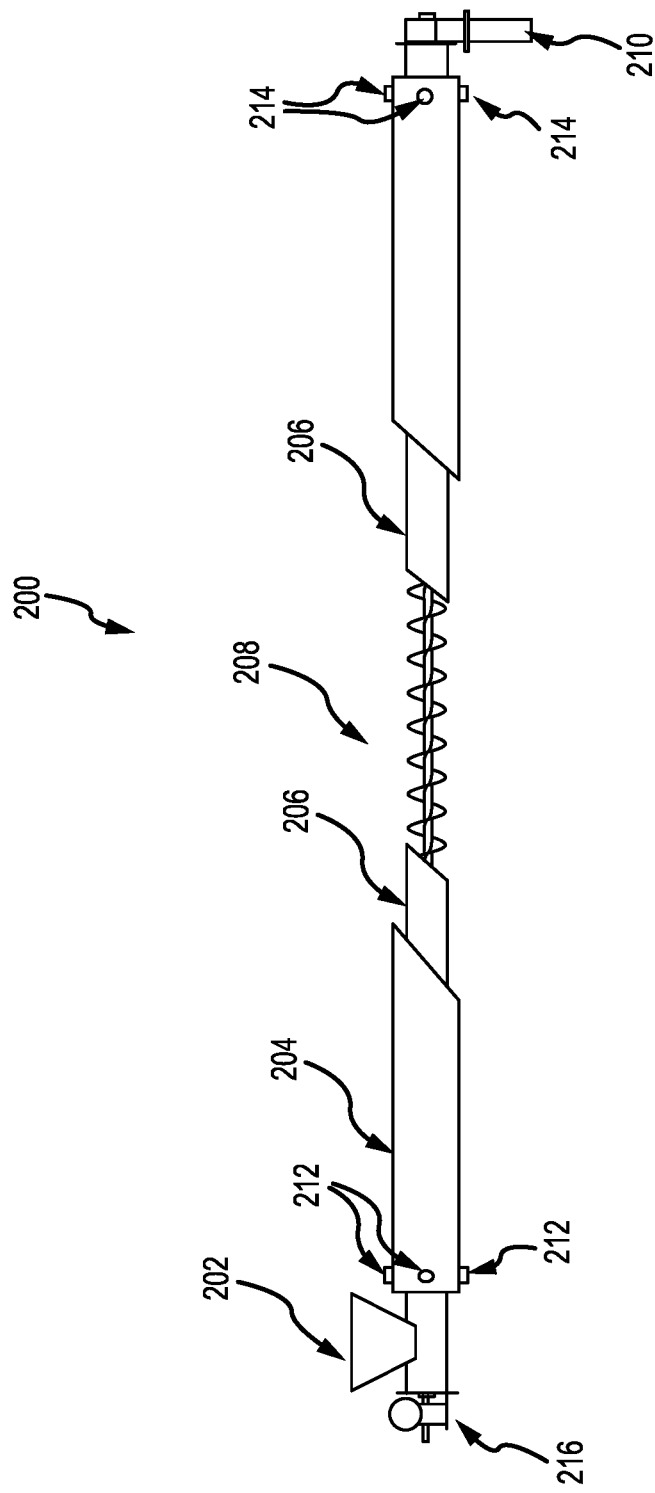
FIG. 8 is a side view of the cooler or heat exchanger of FIG. 7, except a portion of it is shown cutaway.

FIG. 7 illustrates a side view of a char cooler 200, and FIG. 8 illustrates a cutaway side view of the char cooler 200. As seen in the figures, the char cooler 200 may include an ore feed chute 202 that intakes processed ore from the ore discharge port (reference 128 on FIG. 6). The char cooler 200 may also include an outer tube 204, an inner tube 206 positioned within the outer tube 204, and an auger flighting 208 (seen in FIG. 8) positioned within the inner tube 206. Opposite the ore feed chute 202 is an ore discharge port 210. The outside tube 204 includes fluid input ports 212 and fluid discharge ports 214. Since the ore is hot as it enters the feed chute 202, the fluid (e.g., cold water) enters the input ports 212, contacts and cools the outer wall of the inside tube 206, and then exits through the discharge ports 214. The ore is moved through the inside tube 206 via rotation of the auger flighting 208. The auger flighting 208 is rotated via a gear motor 216 to which it is rotatably coupled.

FIG. 9 illustrates a cross-sectional view of the retort 100 of FIGS. 1-3 with induction coils 134 providing heat to the rotating drum 106. As seen in the figure, the outer cover 114 is supported on a flange support 132, which is further supported on cross-braced tubing 160. The tubing 160 is supported by the leveling jacks 118. The induction coils 134 encircle the rotating drum 106 and reside in close proximity thereto. The internal side of the rotating drum includes six lifters therein for agitating the ore.

In certain instances, a method of operating the retort 100 may be as follows. The method may include setting a slope of the drum 106 of the retort 100 relative to a horizontal plane such that an inlet or intake end 104 of the drum 106 is higher than an outlet or discharge end 108 of the drum 108. The drum 106 may include a cylindrical tube 110 extending between the inlet end 104 and the outlet end 108. The retort 100 further may include an electric induction coil 134 proximate the cylindrical tube 110 for heating the cylindrical tube 110. The retort may also include a motor 126 operably and rotatably coupled to the cylindrical tube 110 of the drum 106. The retort 100 may also include first and second supports 118 (e.g., jacks). The first support 118 may be coupled to the drum 106 proximate the inlet end 104, where the first support 118 raises and lowers the inlet end 104 of the drum 106. The second support 118 may be coupled to the drum 106 proximate the outlet end 108, where the second support 118 raises and lowers the outlet end 108 of the drum 106. The retort 100 may include any of the features or elements described in the application without limitation.

The method may also include feeding ore into the inlet port of the drum 106. And the method may also include heating the drum via the electric induction coil so as to remove volatiles from the ore. The method may also include removing oxygen from the drum 106, rotating the drum 106.

Figure 10A:
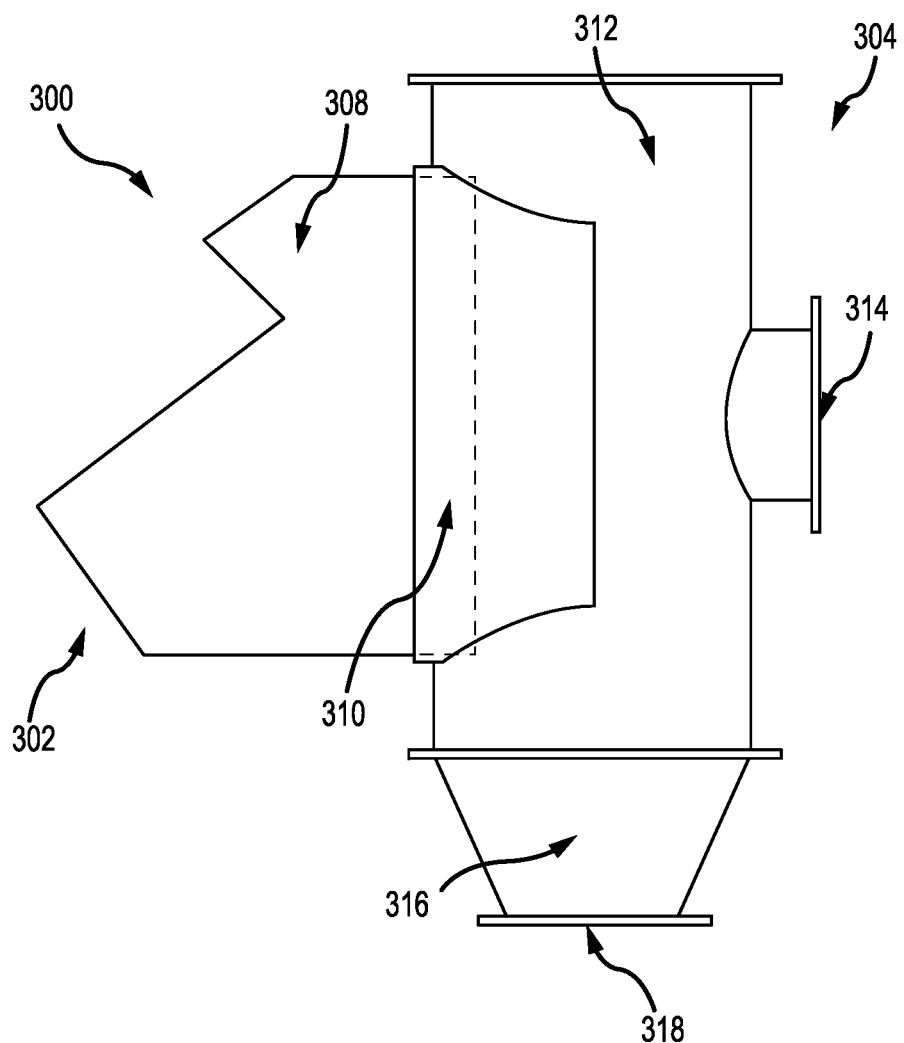
FIGS. 10A-10C are, respectively, a side view, a top view, and an outlet end view of the outlet end of the retort and a lower portion of a distillation column.
Figure 10B:
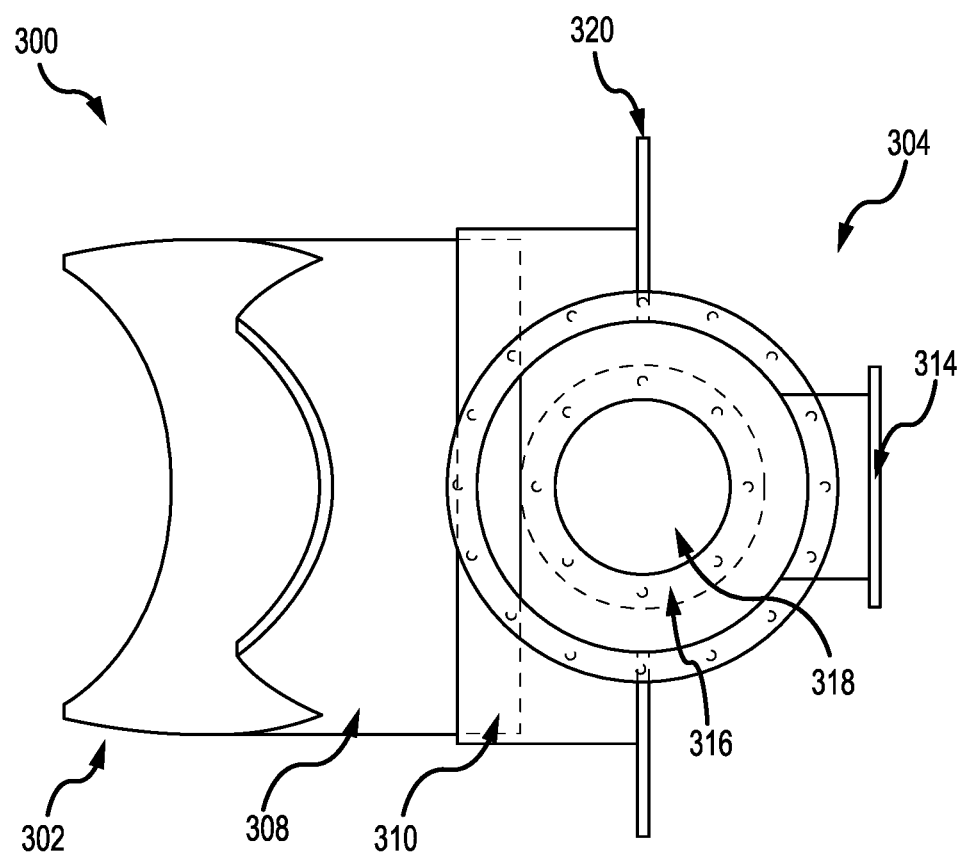
Figure 10C:
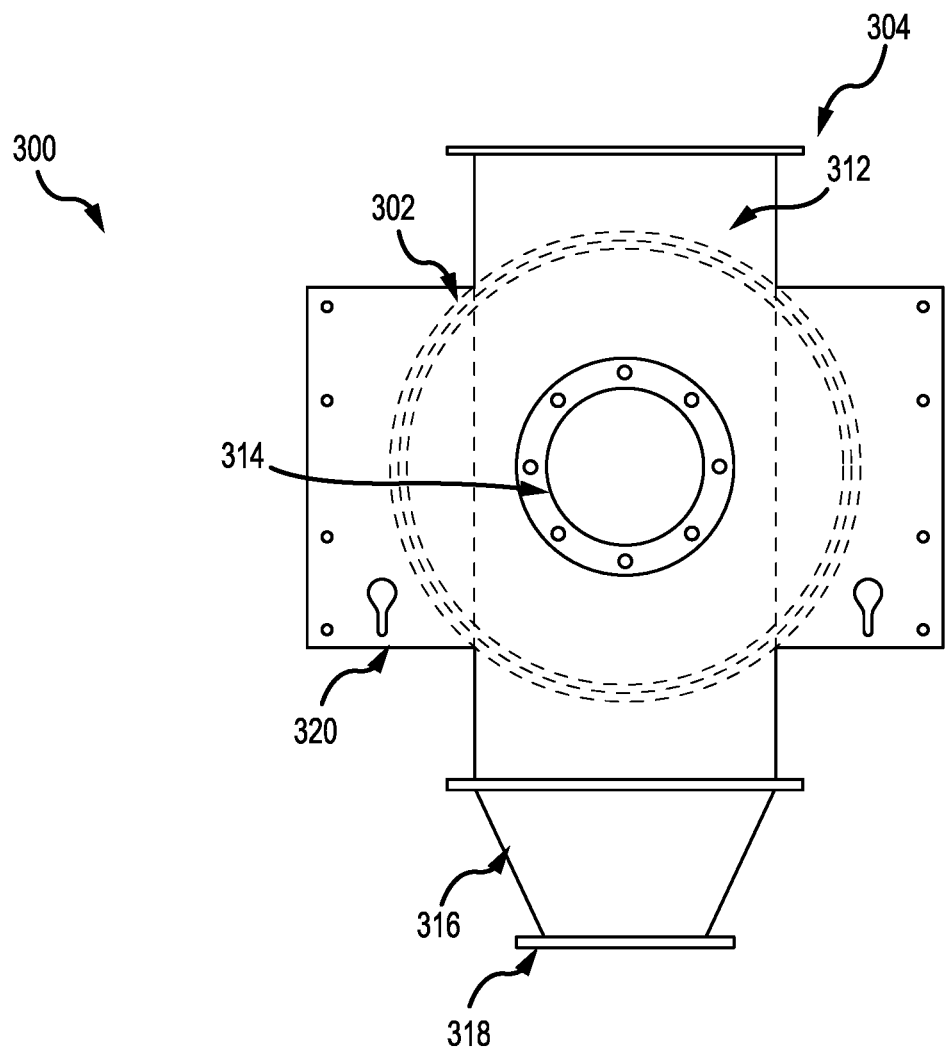
Figure 11A:
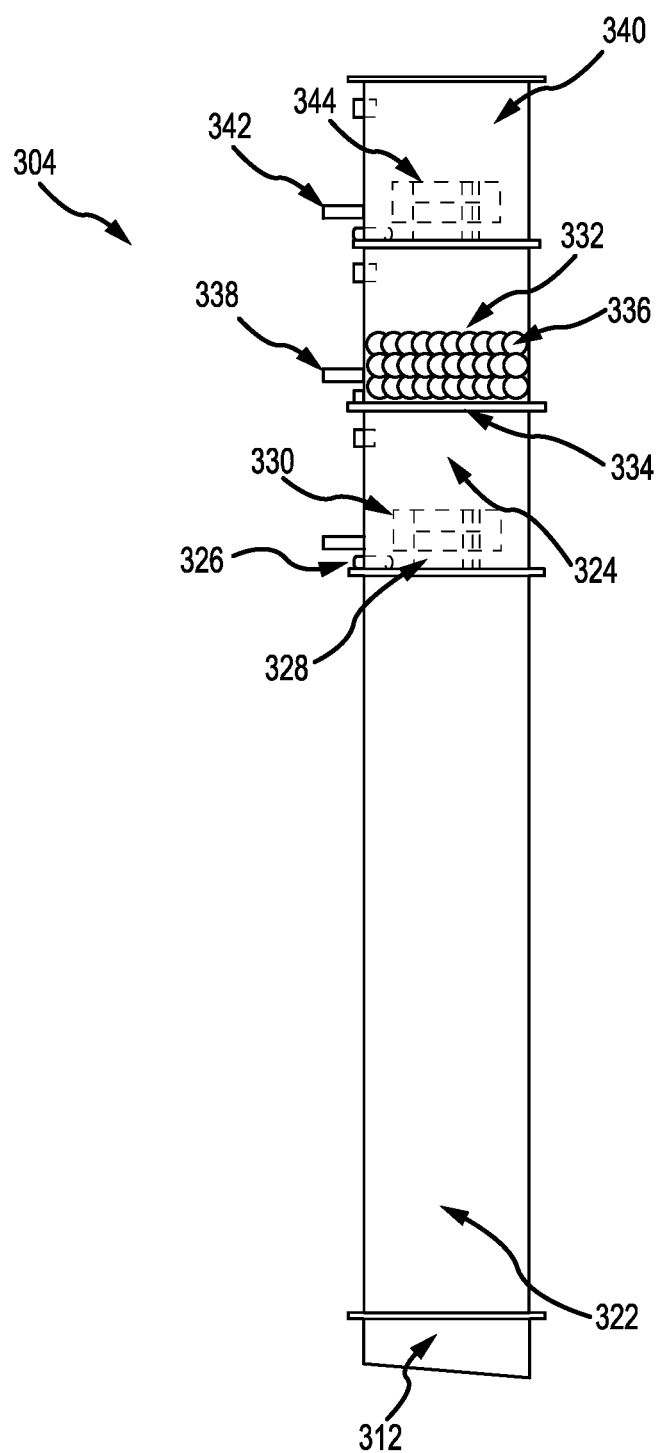
FIGS. 11A and 11B are, respectively, a side view and an isometric view of an upper portion of the distillation column.
Figure 11B:
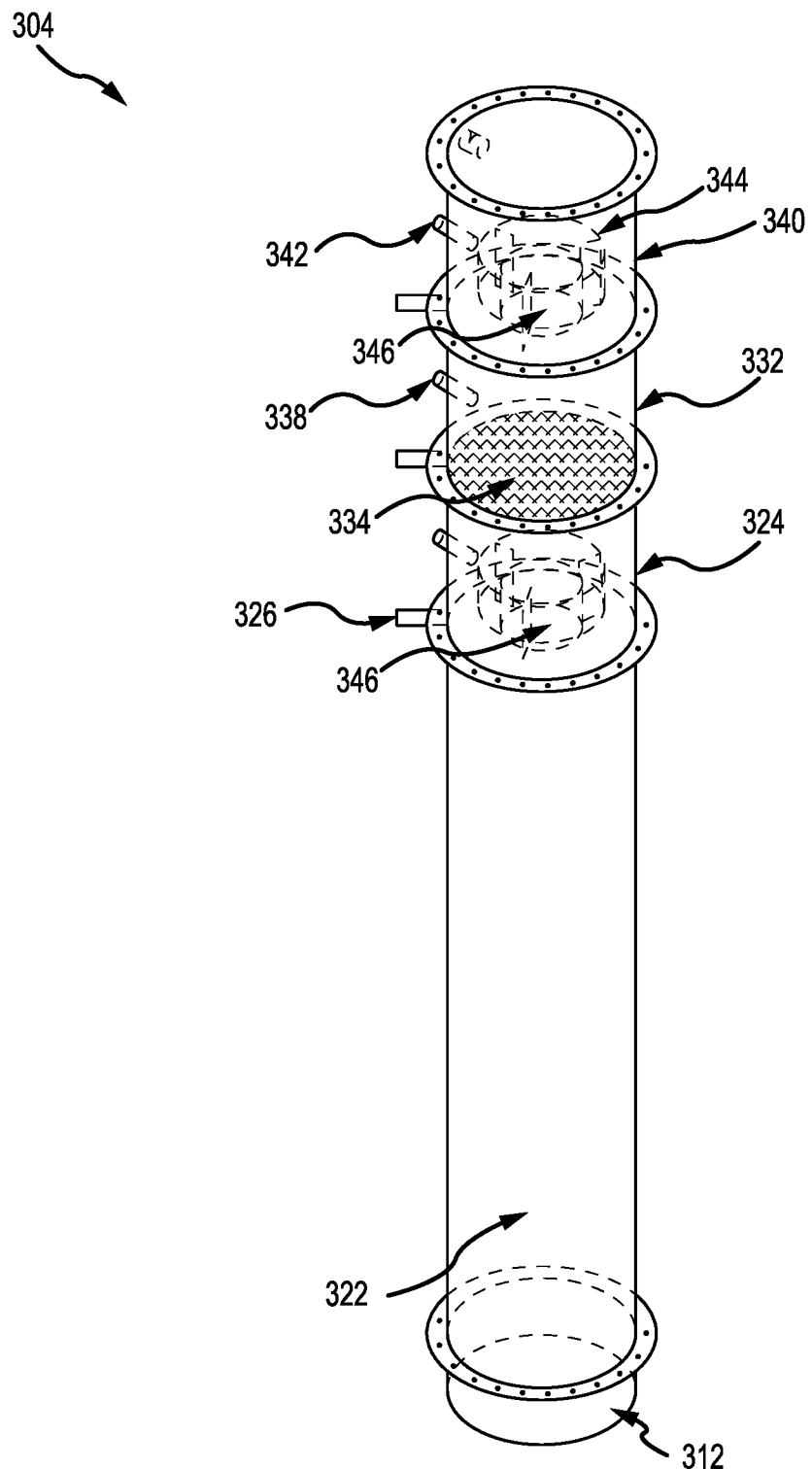

FIGS. 10 and 11 depict a distillation system 300 or portions thereof including the retort 302 and a distillation column 304. FIGS. 10A-10C depict, respectively, a side view, a top view, and an outlet end view of the outlet end 306 of the retort 302 and a lower portion of the distillation column 304. FIGS. 11A and 11B depict, respectively, a side view and an isometric view of an upper portion of the distillation column 304. The retort 302, as shown and described in reference to FIGS. 10 and 11, may include the same or different elements from any of the embodiments of the retort as shown and described previously in this application.

As seen in FIGS. 10A-10C, an outlet end of the rotating drum 308 of the retort 302 is depicted in a sectional view. The outlet end of the rotating drum 308 is received within a receiver pipe 310, which includes a seal and slip ring (not shown) therein for permitting the rotating drum 308 to rotate while sealing the retort 302 with the distillation column 304. The retort 302 may include a diameter of about 24 inches for passing the product there through. The receiver pipe 310 guides the product (e.g., char) from within the rotating drum 308 of the retort 302 to the distillation column 304. More particularly, the receiver pipe 310 is coupled to a distillation coupling pipe 312 of the distillation column 304. The distillation coupling pipe 312 includes an access port 314 for accessing the inside of the distillation coupling pipe 312. An opposite end of the retort 302 may include a similar access port. In certain instances, the retort 302 may be rapidly cooled by opening one or both access ports to permit airflow through the retort 302 from inlet end to outlet end. Opening both access ports may provide a coaxial passageway for air to flow through the retort 302 to cool the retort 302 rapidly. In certain instances, the distillation coupling pipe 312 has a diameter of about 16 inches.

At a bottom end of the distillation coupling pipe 312 is a discharge funnel 316. A rotary valve adaptor flange 318 couples to the bottom of the discharge funnel 316 and releasably closes the opening at the bottom of the funnel 316. Opposite the discharge funnel 316 is an upper portion of the distillation column 304 which will be described with reference to FIGS. 11A and 11B.

As best seen in FIGS. 10B and 10C, a hangar plate 320 couples to and extends outward from the receiver pipe 310. The hangar plate 320 includes mounting holes for mounting the hangar plate 320, and thus the distillation column 304, to a supporting structure (e.g., wall, frame).

In operation, as the product is discharged from the rotating drum 308 of the retort 302, different portions of the product move through the distillation column 304 as follows: a solid portion of the product (e.g., char) enters the distillation coupling pipe 312 and falls towards the discharge funnel 316 via gravity; a gaseous portion of the product (e.g., volatiles) enters the distillation coupling pipe 312 and rises therein to an upper portion of the distillation column 304 for processing (FIGS. 11A-11B); and small particle portions of the product (e.g., dust) are carried with the gaseous portion of the product upwards in the distillation column 304. The small particle portions of the product pose challenges for processing of the gaseous portion. The small particle portions of the product also pose general challenges with cleanly and efficiently operating the system 300 due to the condensation of the gaseous portion of the product in the distillation column 304, which causes the small particle portions to attach or stick to the walls of the column 304 and generally create an unclean environment for processing the gaseous portion of the product.

Accordingly, the distillation column 304 described herein is designed to effectuate the small particle portions of the product either joining the solid product portion of the product at the discharge funnel 316 or permit the small particle portions of the product to flow along with the gaseous portion to a dust filter within of the distillation column 304. Stated differently, the distillation column 304 described herein is designed to minimize the amount of condensation of the gaseous portion of the product, which carries the solid particle portion, until the gaseous portion encounters a filtered portion of the distillation column 304.

FIGS. 11A and 11B depict an upper portion of the distillation column 304 that is positioned above the distillation coupling pipe 312. As seen in FIGS. 11A and 11B, the distillation coupling pipe 312 is coupled to a dust trap pipe or section 322. In certain instances, the dust trap section 322 is insulated (e.g., two inch ceramic high temperature fiber wool) so as to limit the temperature drop from the retort 302. Limiting the temperature drop limits the condensation in this section of the distillation column 304, which results in less small particle portions of the product (e.g., dust) from attaching to the inner wall of the pipe. In certain instances the dust trap section 322 is about six feet in length. The dust trap section 322 acts as a vertical continuation of the distillation coupling pipe 312 where no distillation or condensation is designed to take place. It is an extension section that positions the components of the column 304 associated with condensation high up where it will be difficult for solid particles to travel.

Given the length of the dust trap section 322, the insulated nature of the dust trap section, and the low velocity of the gaseous portion of the product carrying the small particle portions due to the relatively similar diameters of the rotating drum of the retort and the distillation column 304, much of the small particle portions fall down through the dust trap section 322 without condensing and attaching to the inner wall of the pipe.

Positioned upwards of the dust trap section 322 is a hat tray pipe or section 324 of the distillation column 304. A reduced diameter opening 346, as seen in FIG. 11B, separates the dust trap section 322 with the hat tray section 324. The hat tray section 324 may include one or more outlet feeds or ports 326 for outflowing of a product from the hat tray section 322. The one or more outlet feeds 326 may be positioned at different heights within the section 324 so as to capture different products. The hat tray section 324 includes a central structure or pipe 328 that extends upwards from a base and into the section 324. The central structure 328 terminates at an opening (not shown). A hat or cover 330 covers the opening of the central structure 328 while still permitting the fluid to flow through the opening. In this way, condensing fluid from above in the distillation column 304 may fall within the hat tray section 324 without entering the opening in the central structure 328. The fluid may pool within the base of the hat tray section 322. The positioning of the one or more outlet feeds 326 determines the height of the pool of fluid. In certain instances, the lower outlet feed 326 is utilized to draw a fluid product from the hat tray section 324. The lower outlet feed 326 is positioned below the opening in the central structure 328 such that the gaseous portion of the product flowing from the dust trap section 322 is not filtered through the pooling fluid in the base of the hat tray section 324. In such an instance, the upper outlet feed 326 may be closed off or not included in the design. In certain instances, the hat tray section 332 may be removed from the distillation column 304.

Positioned upwards of the hat tray section 324 is a packing pipe or section 332 having a screen 334 at a bottom end and a filter 336 (shown in FIG. 11A, but hidden in FIG. 11B for clarity) within the section 332. The screen 334 permits the passage of the gaseous portion of the product there through. The screen 334 may also support the filter 336 in the case of the filter 336 being loose structures that conform to the space of the section 332. In certain instances, the filter 336 includes lava rocks. In certain instances, the filter 336 includes ceramic structures, which may be in the form of rocks, balls, pellets, discs, chips, or flakes, among other forms. In certain instances, the filter 336 may include a fibrous filter.

As the gaseous portion of the product, which can carry the solid particle portion as well, enters the packing section 332, a portion of the gaseous portion of the product condenses into a liquid. The filter 336 attracts the solid particle portions (e.g., dust) during the condensation process leaving a cleaner product (less solid particles) to continue to rise to subsequent sections of the distillation column 304.

The packing section 332 may include one or more outlet feeds 338 for outflowing of a product within the section 332. In certain instances, the outlet feed 338 is closed off. The feeds 338 may be at different heights within the section for outflowing of different products. The packing section 332 may include an window or opening through the wall for maintenance such as replacing the filter 336 and/or cleaning the screen 334.

In operation, as the gaseous product condenses in the packing section 332, the solid particle portion attaches to the filter 336, and a portion of the condensed product falls through the screen 334 and into the hat tray section 324. Once in the hat tray section 324, the liquid product may be drawn from the hat tray section 324 via an outlet feed 326.

Positioned upwards of the packing section 332 is a bubble tray section 340. The bubble tray section 340 includes the same structure as the hat tray section 324, except the gaseous portion of the product flowing up the distillation column 304 is filtered through the pooling fluid in the section 340. This is accomplished by using an outlet feed 342 that is above the opening in the central structure 344 of the section 340. In this way, as the gaseous product rises into the bubble tray section 340, the product is filtered or "bubbled" through the liquid product that pools at the base of the section 340. A portion of the gaseous product that bubbles through the liquid also condenses to form additional liquid, and a portion of the product continues to rise within the distillation column 304 as a gaseous product to subsequent sections of the column 304.

Only one bubble tray section 340 is shown in FIGS. 11A and 11B, but additional bubble tray sections 340 may be included in the distillation column 304. In certain instances, the distillation column 304 includes more than one bubble tray section 340. In certain instances, the distillation column 304 includes two bubble tray sections 340. In certain instances, the distillation column 304 includes three bubble tray sections 340. In certain instances, the distillation column 304 includes four bubble tray sections 340. In certain instances, the distillation column 304 includes five bubble tray sections 340. In certain instances, the distillation column 304 includes six bubble tray sections 340. In certain instances, the distillation column 304 includes seven bubble tray sections 340. In certain instances, the distillation column 304 includes eight or more bubble tray sections 340.

While the present disclosure has been described with reference to various embodiments, it will be understood that these embodiments are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

In general, while the embodiments described herein have been described with reference to particular embodiments, modifications can be made thereto without departing from the spirit and scope of the disclosure. Note also that the term "including" as used herein is intended to be inclusive, i.e. "including but not limited to."

The construction and arrangement of the retort and its systems as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A distillation system comprising:
    a retort including an inlet end, an outlet end opposite the inlet end and including an outlet opening, a rotatable drum configured to heat a product therein and move the product between the inlet end and the outlet end; and
    a distillation column coupled to the outlet end of the retort and configured to receive the product therein upon exiting the outlet opening of the retort, the distillation column including:
        a solid particle trap section positioned above the outlet opening;
        a packing section positioned above the solid particle trap section and including screen at a bottom end thereof, and a dust filter therein; and
        a first bubble tray section positioned above the packing section and including a first outlet feed for outflow of a first fluid product.

2. The distillation system of claim 1, wherein the distillation column further includes: a product discharge section positioned below the outlet opening of the retort and configured for receiving the product in solid form there through.

3. The distillation system of claim 1, wherein the distillation column further includes: a hat tray section positioned between the solid particle trap section and the packing section, the hat tray section includes a reduced diameter opening separating the solid particle trap section and the hat tray section.

4. The distillation system of claim 3, wherein the hat tray section further includes at least one second outlet feed for outflow of a second fluid product.

5. The distillation system of claim 3, wherein a gaseous portion of the product is configured to condense in the packing section and drain into the hat tray section.

6. The distillation system of claim 3, wherein the dust filter includes a ceramic product.

7. The distillation system of claim 6, wherein the ceramic product includes a plurality of ceramic products.

8. The distillation system of claim 3, wherein the dust filter includes lava rocks.

9. The distillation system of claim 1, wherein the distillation column further includes an openable window adjacent the screen of the packing section to facilitate cleaning of the screen.

10. The distillation system of claim 1, wherein the product exiting the outlet opening of the retort is char.

11. The distillation system of claim 1, wherein a drum diameter of the drum of the retort is about 24 inches, and a column diameter of the distillation column is about 16 inches.

12. The distillation system of claim 1, wherein the retort further comprises a motor operably coupled to the drum and configured to rotate the drum.

13. The distillation system of claim 1, wherein the retort further comprises an electrical induction coil proximate the drum and configured to heat the drum.

14. The distillation system of claim 13, wherein the retort further comprises an outer cover encasing at least a portion of the rotatable drum and the electric induction coil.

15. The distillation system of claim 14, wherein the outer cover is not operably and rotatably coupled with the motor such that it remains stationary when the cylindrical tube rotates.

16. The distillation system of claim 1, wherein the retort further comprises a plurality of supports coupled to the rotatable drum and comprising a first support and a second support, the first support coupled to the rotatable drum proximate the inlet end, the first support supporting the drum at a first height, the second support coupled to the rotatable drum proximate the outlet end, the second support supporting the drum at a second height, the first height being greater than the second height.

17. The distillation system of claim 16, wherein the plurality of supports are height-adjustable.

18. The distillation system of claim 17, wherein the plurality of supports comprise mechanical jacks.

19. The distillation system of claim 1, wherein the rotatable drum comprises at least one lifter coupled to an inner wall thereof.

20. The distillation system of claim 1, wherein the retort further comprises an inlet seal and bearings and an outlet seal and bearings so as to permit the rotatable drum to rotate relative to the inlet and outlet ends.

\* \* \* \* \*